United States Patent
Li et al.

(10) Patent No.: US 11,394,521 B2
(45) Date of Patent: Jul. 19, 2022

(54) RESOURCE ALLOCATION INDICATION AND RECEIVING METHODS AND DEVICES

(71) Applicant: ZTE Corporation, Shenzhen (CN)

(72) Inventors: Jian Li, Shenzhen (CN); Peng Hao, Shenzhen (CN); Zhisong Zuo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 72 days.

(21) Appl. No.: 16/764,904

(22) PCT Filed: Nov. 9, 2018

(86) PCT No.: PCT/CN2018/114919
§ 371 (c)(1),
(2) Date: May 18, 2020

(87) PCT Pub. No.: WO2019/096076
PCT Pub. Date: May 23, 2019

(65) Prior Publication Data
US 2020/0295907 A1   Sep. 17, 2020

(30) Foreign Application Priority Data
Nov. 17, 2017  (CN) .......................... 201711147184.4

(51) Int. Cl.
*H04L 5/00* (2006.01)
*H04W 76/27* (2018.01)
*H04W 72/04* (2009.01)

(52) U.S. Cl.
CPC .......... *H04L 5/0092* (2013.01); *H04L 5/0098* (2013.01); *H04W 72/042* (2013.01); *H04W 72/0453* (2013.01); *H04W 76/27* (2018.02)

(58) Field of Classification Search
CPC .. H04L 5/0092; H04L 5/0098; H04W 72/042; H04W 72/0453; H04W 76/27
See application file for complete search history.

(56) References Cited

U.S. PATENT DOCUMENTS 10,805,917 B2 * 10/2020 Ranta-aho ............. H04W 16/12
2015/0036618 A1   2/2015 Xu
(Continued)

FOREIGN PATENT DOCUMENTS

CA   3069613 A1 *  1/2019  ........... H04B 7/0456
CA   3082698 A1 *  5/2019  ........... H04L 5/0007
(Continued)

OTHER PUBLICATIONS

ZTE, Resource Allocation in Frequency Domain, Jun. 27, 2017, 3GPP TSG RAN WG1 NR Ad-Hoc#2, Tdoc: R1-1710121 (Year: 2017).*
(Continued)

*Primary Examiner* — Eric Nowlin
(74) *Attorney, Agent, or Firm* — Cantor Colburn LLP

(57) ABSTRACT

The embodiments of the present application disclose resource allocation indication and receiving methods and devices. The resource allocation indication method includes that: a Base Station (BS) sends first indication information, wherein the first indication information is configured to indicate an activated Bandwidth Part (BWP) message and the activated BWP message at least includes BWP Bandwidth (BW) information; and the BS sends second indication information, wherein the second indication information is configured to indicate one or more groups of first-level Resource Block Group (RBG) sizes, each group of first-level RBG sizes includes multiple first-level RBG sizes, and each first-level RBG size corresponds to different BWP
(Continued)

A BS sends first indication information, wherein the first indication information is configured to indicate an activated BWP message and the activated BWP message at least includes BWP BW information — S102

The BS sends second indication information, wherein the second indication information is configured to indicate one or more groups of first-level RBG sizes, each group of first-level RBG sizes includes multiple first-level RBG sizes and each first-level RBG size corresponds to different BWP BWs, wherein there is a corresponding relationship between the first-level RBG size and different BWP BWs — S104

BWs, wherein there is a corresponding relationship between the first-level RBG size and different BWP BWs.

19 Claims, 5 Drawing Sheets

(56) References Cited

U.S. PATENT DOCUMENTS

| | | | | |
|---|---|---|---|---|
| 2016/0021661 | A1* | 1/2016 | Yerramalli | H04W 72/00 370/329 |
| 2019/0045549 | A1* | 2/2019 | Wu | H04W 72/085 |
| 2019/0141711 | A1* | 5/2019 | Fu | H04L 5/00 |
| 2019/0159182 | A1* | 5/2019 | Ranta-aho | H04L 5/0094 |
| 2020/0021420 | A1* | 1/2020 | Li | H04L 5/0007 |
| 2020/0127782 | A1* | 4/2020 | Tang | H04W 72/042 |
| 2020/0235894 | A1* | 7/2020 | Takeda | H04L 5/0039 |
| 2020/0275416 | A1* | 8/2020 | Haghighat | H04B 7/0456 |
| 2020/0337075 | A1* | 10/2020 | Shen | H04W 72/1273 |
| 2021/0185684 | A1* | 6/2021 | Miao | H04W 72/0453 |
| 2022/0046617 | A1* | 2/2022 | Sasaki | H04B 7/02 |

FOREIGN PATENT DOCUMENTS

| | | | | |
|---|---|---|---|---|
| CN | 102017483 | A | | 4/2011 |
| CN | 103298117 | A | | 9/2013 |
| CN | 110731109 | A * | 1/2020 | H04L 5/0005 |
| CN | 110832935 | A * | 2/2020 | H04W 72/0453 |
| CN | 110892767 | A * | 3/2020 | H04L 5/0044 |
| CN | 110915175 | A * | 3/2020 | H04B 7/0456 |
| DE | 112018000160 | T5 * | 8/2019 | H04W 72/042 |
| EP | 3654599 | A1 * | 5/2020 | H04B 7/0456 |
| JP | 2021511689 | A * | 11/2017 | |
| KR | 20200083948 | A * | 7/2020 | H04W 72/042 |
| WO | WO2019012669 | A1 * | 7/2017 | |
| WO | WO-2018232284 | A1 * | 12/2018 | H04W 72/042 |
| WO | WO-2019012669 | A1 * | 1/2019 | H04B 7/0456 |
| WO | WO-2019028767 | A1 * | 2/2019 | H04L 5/0092 |
| WO | WO-2019051695 | A1 * | 3/2019 | H04L 5/0005 |
| WO | WO-2019095225 | A1 * | 5/2019 | H04L 5/0092 |
| WO | WO-2019095232 | A1 * | 5/2019 | H04L 1/1614 |
| WO | WO-2019095739 | A1 * | 5/2019 | H04W 72/04 |

OTHER PUBLICATIONS

NEC, Frequency-Domain Resource Allocation Schemes for NR, Jun. 27, 2017, 3GPP TSG RAN WG1 NR Ad-Hoc#2, Tdoc: R1-1710245 (Year: 2017).*
LG Electronics, Discussion on Frequency-Domain Resource Allocation, Jun. 27, 2017, 3GPP TSG RAN WG1 NR Ad-Hoc#2, Tdoc: R1-1710323 (Year: 2017).*
Intel Corporation, DL/UL Data Frequency Resource Allocation, Jun. 27, 2017, 3GPP TSG RAN WG1 NR Ad-Hoc#2, Tdoc: R1-1710565 (Year: 2017).*
Interdigital, Inc., On Frequency-Domain Resource Allocation for NR, Jun. 27, 2017, 3GPP TSG RAN WG1 NR Ad-Hoc#2, Tdoc: R1-1710953 (Year: 2017).*
Nokia et al., On Resource Allocation in Frequency Domain for PDSCH and PUSCH in NR, Jun. 27, 2017, 3GPP TSG RAN WG1 NR Ad-Hoc#2, Tdoc: R1-1710989 (Year: 2017).*
NTT Docomo, Inc., Frequency-Domain Resource Allocation, Jun. 27, 2017, 3GPP TSG RAN WG1 NR Ad-Hoc#2, Tdoc: R1-1711107 (Year: 2017).*
Ericsson, On Resource Allocation in the Frequency Domain, Jun. 27, 2017, 3GPP TSG RAN WG1 NR Ad-Hoc#2, Tdoc: R1-1711499 (Year: 2017).*
Huawei et al., Scheduling and Resource Allocation for Bandwidth Parts, Aug. 21, 2017, 3GPP TSG RAN WG1 Meeting #90, Tdoc: R1-1712156 (Year: 2017).*
CATT, NR DL/UL Frequency Domain Resource Allocation, Aug. 21, 2017, 3GPP TSG RAN WG1 Meeting #90, Tdoc: R1-1712410 (Year: 2017).*
ZTE, Resource Allocation in Frequency Domain, Aug. 21, 2017, 3GPP TSG RAN WG1 Meeting #90, Tdoc: R1-1712458 (Year: 2017).*
Intel Corporation, DL/UL Data Frequency Resource Allocation, Aug. 21, 2017, 3GPP TSG RAN WG1 Meeting #90, Tdoc: R1-1712589 (Year: 2017).*
Fujitsu, Discussion on Frequency Domain Resource Allocation, Aug. 21, 2017, 3GPP TSG RAN WG1 Meeting #90, Tdoc: R1-1712741 (Year: 2017).*
Vivo, Discussion on Frequency-Domain Resource Allocation, Aug. 21, 2017, 3GPP TSG RAN WG1 Meeting #90, Tdoc: R1-1712861 (Year: 2017).*
Guangdong OPPO Mobile Telecom, RBG Size Determinations and Frequency Resource Allocation, Aug. 21, 2017, 3GPP TSG RAN WG1 Meeting #90, Tdoc: R1-1713262 (Year: 2017).*
Samsung, DL/UL Frequency Resource Allocation, Aug. 21, 2017, 3GPP TSG RAN WG1 Meeting #90, Tdoc: R1-1713635 (Year: 2017).*
NTT Docomo, Inc., Frequency-Domain Resource Allocation, Aug. 21, 2017, 3GPP TSG RAN WG1 Meeting #90, Tdoc: R1-1713948 (Year: 2017).*
Nokia et al., On Resource Allocation in Frequency Domain for PDSCH and PUSCH in NR, Aug. 21, 2017, 3GPP TSG RAN WG1 Meeting #90, Tdoc: R1-1714007 (Year: 2017).*
Interdigital, Inc., On Frequency-Domain Resource Allocation for NR, Aug. 21, 2017, 3GPP TSG RAN WG1 Meeting #90, Tdoc: R1-1714159 (Year: 2017).*
Fujitsu, Discussion on Frequency Domain Resource Allocation, Sep. 18, 2017, 3GPP TSG RAN WG1 Meeting NR#3, Tdoc: R1-1715487 (Year: 2017).*
Nokia et al., On Resource Allocation for PDSCH and PUSCH in NR, Sep. 18, 2017, 3GPP TSG RAN WG1 Meeting NR#3, Tdoc: R1-1715545 (Year: 2017).*
Guangdong OPPO Mobile Telecom, Resource Allocation for PDSCH/PUSCH, Sep. 18, 2017, 3GPP TSG RAN WG1 Meeting NR#3, Tdoc: R1-1715690 (Year: 2017).*
Panasonic, DL/UL Resource Allocation, Sep. 18, 2017, 3GPP TSG RAN WG1 Meeting NR#3, Tdoc: R1-1715779 (Year: 2017).*
Samsung, DL/UL Resource Allocation, Sep. 18, 2017, 3GPP TSG RAN WG1 Meeting NR#3, Tdoc: R1-1716004 (Year: 2017).*
NTT Docomo, Inc., DL/UL Resource Allocation, Sep. 18, 2017, 3GPP TSG RAN WG1 Meeting NR#3, Tdoc: R1-1716104 (Year: 2017).*
Interdigital, Inc., On Data Resource Allocation for NR, Sep. 18, 2017, 3GPP TSG RAN WG1 Meeting NR#3, Tdoc: R1-1716482 (Year: 2017).*
Ericsson, On DL/UL Resource Allocation, Sep. 18, 2017, 3GPP TSG RAN WG1 Meeting NR#3, Tdoc: R1-1716594 (Year: 2017).*
Motorola Mobility et al., On RBG Size for Frequency Domain Resource Allocation, Sep. 18, 2017, 3GPP TSG RAN WG1 Meeting NR#3, Tdoc: R1-1716645 (Year: 2017).*
LG Electronics, Discussion on Resource Allocation and TBS Determination, Oct. 9, 2017, 3GPP TSG RAN WG1 Meeting 90bis, Tdoc: R1-1717965 (Year: 2017).*
OPPO, Resource Allocation for PDSCH/PUSCH, Oct. 9, 2017, 3GPP TSG RAN WG1 Meeting 90bis, Tdoc: R1-1718048 (Year: 2017).*
Panasonic, DL/UL Resource Allocation, Oct. 9, 2017, 3GPP TSG RAN WG1 Meeting 90bis, Tdoc: R1-1718286 (Year: 2017).*
Interdigital, Inc., On Remaining Details of Data Resource Allocation, Oct. 9, 2017, 3GPP TSG RAN WG1 Meeting 90bis, Tdoc: R1-1718494 (Year: 2017).*
Qualcomm Incorporated, DL/UL Resource Allocation, Oct. 9, 2017, 3GPP TSG RAN WG1 Meeting 90bis, Tdoc: R1-1718568 (Year: 2017).*
Nokia et al., On Resource Allocation for PDSCH and PUSCH in NR, Oct. 9, 2017, 3GPP TSG RAN WG1 Meeting 90bis, Tdoc: R1-1718620 (Year: 2017).*
Ericsson, On DL/UL Resource Allocation, Oct. 9, 2017, 3GPP TSG RAN WG1 Meeting 90bis, Tdoc: R1-1718644 (Year: 2017).*
Motorola Mobility et al., On Resource Allocation RBG Size, Oct. 9, 2017, 3GPP TSG RAN WG1 Meeting 90bis, Tdoc: R1-1718703 (Year: 2017).*

(56) References Cited

OTHER PUBLICATIONS

Ericsson, Summary of 7.3.3.1 (DL/UL Resource Allocation), Oct. 9, 2017, 3GPP TSG RAN WG1 Meeting 90bis, Tdoc: R1-1718786 (Year: 2017).*
Ericsson, Summary of Offline Discussion on 7.3.3.1 (DL/UL Resource Allocation), Oct. 9, 2017, 3GPP TSG RAN WG1 Meeting 90bis, Tdoc: R1-1718983 (Year: 2017).*
Huawei et al., Resource Allocation and TBS, Nov. 27, 2017, 3GPP TSG RAN WG1 Meeting #91, Tdoc: R1-1719381 (Year: 2017).*
ZTE et al., Considerations on Resource Allocation Issues, Nov. 27, 2017, 3GPP TSG RAN WG1 Meeting #91, Tdoc: R1-1719491 (Year: 2017).*
Ericsson, On TBS Determination and DL/UL Resource Allocation, Nov. 27, 2017, 3GPP TSG RAN WG1 Meeting #91, Tdoc: R1-1719596 (Year: 2017).*
Vivo, On DL/UL Resource Allocation, Nov. 27, 2017, 3GPP TSG RAN WG1 Meeting #91, Tdoc: R1-1719793 (Year: 2017).*
LG Electronics, Discussion on Resource Allocation and TBS Determination, Nov. 27, 2017, 3GPP TSG RAN WG1 Meeting #91, Tdoc: R1-1719929 (Year: 2017).*
OPPO, Resource Allocation for PDSCH/PUSCH, Nov. 27, 2017, 3GPP TSG RAN WG1 Meeting #91, Tdoc: R1-1719973 (Year: 2017).*
Intel Corporation, Remaining Details on TBS Determination and Resource Allocation, Nov. 27, 2017, 3GPP TSG RAN WG1 Meeting #91, Tdoc: R1-1720094 (Year: 2017).*
CATT, On PDSCH and PUSCH Resource Allocation, Nov. 27, 2017, 3GPP TSG RAN WG1 Meeting #91, Tdoc: R1-1720202 (Year: 2017).*
Samsung, DL/UL Resource Allocation, Nov. 27, 2017, 3GPP TSG RAN WG1 Meeting #91, Tdoc: R1-1720339 (Year: 2017).*
Panasonic, DL/UL Resource Allocation, Nov. 27, 2017, 3GPP TSG RAN WG1 Meeting #91, Tdoc: R1-1720497 (Year: 2017).*
NTT Docomo, Inc., DL/UL Resource Allocation, Oct. 9, 2017, 3GPP TSG RAN WG1 Meeting 90bis, Tdoc: R1-1718216 (Year: 2017).*
CATT, "3GPP TSG RAN WGI Meeting 90bis R1-1717833, PDSCH and PUSCH Resource Allocation", Oct. 13, 2017.
Fujitsu., "3GPP TSG RAN WG1 Meeting 90bis R1-1717718", Discussion on Fequency Domain Resource Allocation, Oct. 13, 2017.
Guangdong OPPO Mobile Telecom., "3GPP TSG RAN WG1 NR Ad-Hoc#2, R1-1710164, Bandwidth Part Configuration and Frequency Resource Allocation", Jun. 30, 2017.
International Search Report for corresponding application PCT/CN2018/114919 filed Nov. 9, 2018; dated Jan. 30, 2019.
Vivo., "3GPP TSG RAN WG1 Meeting NR#3 R1-1715642", On DL/UL Resource Allocation, Sep. 21, 2017.
3GPP TS 38.214, 3rd Generation Partnership Project: Technical Specification Group Radio Access Network, 2017, http://www.3gpp.org.
CATT, "NR DL/UL frequency domain resource allocation", Prague, Aug. 21-25, 2017, R1-1712410.
European Search Report for corresponding application EP 18 87 9747: Report dated Nov. 4, 2020.
InterDigital, Inc. "On Remaining details of data resource allocation, 3GPP TGS RAN WG1 Meeting 90bis", Oct. 9-13, 2017; R1-1718494.
NEC, "DL/UL RA schemes for NR", 3GPP TSG-RAN WG1 Meeting NR#3, Japan, Sep. 18-21, R1-1716230.

* cited by examiner

RESOURCE ALLOCATION INDICATION AND RECEIVING METHODS AND DEVICES

CROSS-REFERENCE TO RELATED APPLICATIONS

The present application is filed based upon and claims priority to Chinese Patent Application No. 201711147184.4, filed on Nov. 17, 2017, the contents of which are hereby incorporated by reference in its entirety.

TECHNICAL FIELD

The present application relates to the field of communication, and particularly to resource allocation indication and receiving methods and devices.

BACKGROUND

Along with the development of wireless communication technologies and the increase of communication requirements of users, for meeting requirements on higher, faster and up-to-date communication, 5th Generation (5G), has become a trend of network development in the future.

A 5G communication system is considered to be implemented in a higher and broader band (for example, above 3 GHz) to achieve a higher data rate. A larger Bandwidth (BW) may exceed a maximum BW supported by User Equipment (UE), and a New Radio Access Technology (New RAT, also abbreviated as NR) introduces Bandwidth Part (BWP) to solve this problem. In addition, a conclusion that different BWs should correspond to different Resource Block Group (RBG) sizes has been made in a present standard, but specific RBG size values are not determined, as shown in Table 1.

TABLE 1

|  | Config 1 | Config 2 |
|---|---|---|
| X0-X1 RBs | RBG size 1 | RBG size 2 |
| X1 + 1-X2 RBs | RBG size 3 | RBG size 4 |
| . . . | . . . | . . . |

SUMMARY

Different RBG size values may make sizes of resource allocation regions different for different Downlink Control Information (DCI), and consequently, DCI blind detection complexity may be increased.

For the problem of relatively high DCI blind detection complexity caused by adoption of resource allocation regions in different sizes for BWPs with different BWs in the related art, there is yet no effective solution proposed.

Embodiments of the present application provide resource allocation indication and receiving methods and devices, which may solve at least the problem of relatively high DCI blind detection complexity caused by adoption of resource allocation regions in different sizes for BWPs with different BWs.

According to a first aspect of the embodiments of the present application, a resource allocation indication method is provided, which may include that: a Base Station (BS) sends first indication information, where the first indication information is configured to indicate an activated BWP message and the activated BWP message includes at least BWP BW information; and the base station sends second indication information, where the second indication information is configured to indicate one or more groups of first-level RBG sizes, each group of first-level RBG sizes includes multiple first-level RBG sizes, and each first-level RBG size corresponds to different BWP BWs, where there is a corresponding relationship between the first-level RBG size and different BWP BWs.

In an embodiment, the corresponding relationship may include that a value of the first-level RBG size is directly proportional to a BWP BW range.

In an embodiment, the corresponding relationship may include that: a value of the first-level RBG size includes at least one of 1, 2, 3, 4, 6, 8, 10, 11, 12 and 16; when the value of the first-level RBG size is 1, a BWP BW range of an activated BWP is Resource Blocks (RBs) in a number less than or equal to one of 31, 26 and 22; when the value of the first-level RBG size is 2, the BWP BW range of the activated BWP is 32 to 62 RBs, or 27 to 62 RBs, or 23 to 44 RBs; when the value of the first-level RBG size is 3, the BWP BW range of the activated BWP is 45 to 66 RBs; when the value of the first-level RBG size is 4, the BWP BW range of the activated BWP is 63 to 124 RBs, or 67 to 132 RBs; when the value of the first-level RBG size is 6, the BWP BW range of the activated BWP is 125 to 176 RBs, or 67 to 132 RBs; when the value of the first-level RBG size is 8, the BWP BW range of the activated BWP is 177 to 248 RBs, or 125 to 248 RBs, or 125 to 220 RBs, or 125 to 227 RBs; when the value of the first-level RBG size is 10, the BWP BW range of the activated BWP is 249 to 275 RBs, or 221 to 275 RBs, or 228 to 275 RBs; when the value of the first-level RBG size is 11, the BWP BW range of the activated BWP is 249 to 275 RBs; when the value of the first-level RBG size is 12, the BWP BW range of the activated BWP is 133 to 240 RBs; and when the value of the first-level RBG size is 16, the BWP BW range of the activated BWP is 241 to 275 RBs.

In an embodiment, the method may further include that: the BS sends third indication information, where the third indication information is configured to indicate a part of activated BWPs selected from activated BWPs; and the BS sends fourth indication information, where the fourth indication information is configured to indicate resource allocation and the number of bits required by the fourth indication information under different activated BWPs is a fixed value.

In an embodiment, the method may further include that: the BS sends fifth indication information, where the fifth indication information is configured to indicate a second-level RBG size.

In an embodiment, the number of the bits required by the fourth indication information may be determined according to the following formula:

$$\max_{1 \leq i \leq n}\left(\left\lceil \log_2\left(\left\lceil \frac{N_{RB}^i}{G} \right\rceil * \left(\left\lceil \frac{N_{RB}^i}{G} \right\rceil + 1\right)/2\right)\right\rceil\right), \text{ or,}$$

$$\max_{1 \leq i \leq n}\left(\left\lceil \left\lceil \frac{N_{RB}^i}{G} \right\rceil / P \right\rceil\right),$$

where G may be the first-level RBG size, $N_{RB}^i$ may be a BW of an i-th activated BWP, n may be the number of the activated BWPs, i and n may be integers and P may be the second-level RBG size;

when $$\left\lceil \frac{N_{RB}^i}{G} \right\rceil$$

is less than or equal to 12, a value of the second-level RBG size may be 1; and when $$\left\lceil \frac{N_{RB}^i}{G} \right\rceil$$

is more than 12, the value of the second-level RBG size may be 2.

In an embodiment, the BS may send sixth indication information, where the sixth indication information is configured to indicate one group of RBG sizes selected from multiple groups of RBG sizes, and the multiple groups of RBG sizes represent different resource allocation granularities.

In an embodiment, valid bits in bits required by fourth indication information under different BWP BWs may be approximate.

In an embodiment, the BS may select the part of activated BWPs based on one of the following information: a service characteristic of UE, a load condition of the UE, a capability condition of the UE and a channel environment.

In an embodiment, the BS may send at least one of the following indication information through a Radio Resource Control (RRC) message: the first indication information, the second indication information, the fifth indication information and the sixth indication information.

In an embodiment, the BS may send the third indication information and/or the fourth indication information through a DCI message.

According to a second aspect of the embodiments of the present application, a resource allocation indication receiving method is provided, which may include that: UE receives first indication information sent by a BS, where the first indication information is configured to indicate an activated BWP message and the activated BWP message includes at least BWP BW information; and the UE receives second indication information sent by the BS, where the second indication information is configured to indicate one or more groups of first-level RBG sizes, each group of first-level RBG sizes includes multiple first-level RBG sizes, and each first-level RBG size corresponds to different BWP BWs, where there is a corresponding relationship between the first-level RBG size and different BWP BWs.

In an embodiment, the corresponding relationship may include that a value of the first-level RBG size is directly proportional to a BWP BW range.

In an embodiment, the corresponding relationship may include that: a value of the first-level RBG size includes at least one of 1, 2, 3, 4, 6, 8, 10, 11, 12 and 16; when the value of the first-level RBG size is 1, a BWP BW range of an activated BWP is RBs in a number less than or equal to one of 31, 26 and 22; when the value of the first-level RBG size is 2, the BWP BW range of the activated BWP is 32 to 62 RBs, or 27 to 62 RBs, or 23 to 44 RBs; when the value of the first-level RBG size is 3, the BWP BW range of the activated BWP is 45 to 66 RBs; when the value of the first-level RBG size is 4, the BWP BW range of the activated BWP is 63 to 124 RBs, or 67 to 132 RBs; when the value of the first-level RBG size is 6, the BWP BW range of the activated BWP is 125 to 176 RBs, or 67 to 132 RBs; when the value of the first-level RBG size is 8, the BWP BW range of the activated BWP is 177 to 248 RBs, or 125 to 248 RBs, or 125 to 220 RBs, or 125 to 227 RBs; when the value of the first-level RBG size is 10, the BWP BW range of the activated BWP is 249 to 275 RBs, or 221 to 275 RBs, or 228 to 275 RBs; when the value of the first-level RBG size is 11, the BWP BW range of the activated BWP is 249 to 275 RBs; when the value of the first-level RBG size is 12, the BWP BW range of the activated BWP is 133 to 240 RBs; and when the value of the first-level RBG size is 16, the BWP BW range of the activated BWP is 241 to 275 RBs.

In an embodiment, the method may further include that: 1) the UE receives third indication information sent by the BS, where the third indication information is configured to indicate a part of activated BWPs selected from activated BWPs; and 2) the UE receives fourth indication information sent by the BS, where the fourth indication information is configured to indicate resource allocation and the number of bits required by the fourth indication information under different activated BWPs is a fixed value.

In an embodiment, the method may further include that: the UE receives fifth indication information sent by the BS, where the fifth indication information is configured to indicate a second-level RBG size.

In an embodiment, the number of the bits required by the fourth indication information may be determined according to the following formula:

$$\max_{1 \leq i \leq n}\left(\left\lceil \log_2\left(\left\lceil \frac{N_{RB}^i}{G} \right\rceil * \left(\left\lceil \frac{N_{RB}^i}{G} \right\rceil + 1\right)/2\right)\right\rceil\right), \text{ or,}$$

$$\max_{1 \leq i \leq n}\left(\left\lceil \left\lceil \frac{N_{RB}^i}{G} \right\rceil / P \right\rceil\right),$$

where G may be the first-level RBG size, $N_{RB}^i$ may be a BW of an i-th activated BWP, n may be the number of the activated BWPs, i and n may be integers and P may be the second-level RBG size;
when $$\left\lceil \frac{N_{RB}^i}{G} \right\rceil$$

is less than or equal to 12, a value of the second-level RBG size may be 1; and when $$\left\lceil \frac{N_{RB}^i}{G} \right\rceil$$

is more than 12, the value of the second-level RBG size may be 2.

In an embodiment, the method may further include that: the UE receives sixth indication information sent by the BS, where the sixth indication information is configured to indicate one group of RBG sizes selected from multiple groups of RBG sizes, and the multiple groups of RBG sizes represent different resource allocation granularities.

In an embodiment, valid bits in bits required by fourth indication information under different BWP BWs may be approximate.

According to a third aspect of the embodiments of the present application, a resource allocation indication device is provided, which may be applied to a BS and include: a first sending module, configured to send first indication information, where the first indication information is configured to indicate an activated BWP message and the activated BWP message includes at least BWP BW information; and a second sending module, configured to send second indication information, where the second indication information is configured to indicate one or more groups of first-level RBG sizes, each group of first-level RBG sizes includes multiple first-level RBG sizes, and each first-level RBG size corresponds to different BWP BWs, where there is a corresponding relationship between the first-level RBG size and different BWP BWs.

In an embodiment, the corresponding relationship may include that a value of the first-level RBG size is directly proportional to a BWP BW range.

In an embodiment, the corresponding relationship may include that: a value of the first-level RBG size includes at least one of 1, 2, 3, 4, 6, 8, 10, 11, 12 and 16; when the value of the first-level RBG size is 1, a BWP BW range of an activated BWP is RBs in a number less than or equal to one of 31, 26 and 22; when the value of the first-level RBG size is 2, the BWP BW range of the activated BWP is 32 to 62 RBs, or 27 to 62 RBs, or 23 to 44 RBs; when the value of the first-level RBG size is 3, the BWP BW range of the activated BWP is 45 to 66 RBs; when the value of the first-level RBG size is 4, the BWP BW range of the activated BWP is 63 to 124 RBs, or 67 to 132 RBs; when the value of the first-level RBG size is 6, the BWP BW range of the activated BWP is 125 to 176 RBs, or 67 to 132 RBs; when the value of the first-level RBG size is 8, the BWP BW range of the activated BWP is 177 to 248 RBs, or 125 to 248 RBs, or 125 to 220 RBs, or 125 to 227 RBs; when the value of the first-level RBG size is 10, the BWP BW range of the activated BWP is 249 to 275 RBs, or 221 to 275 RBs, or 228 to 275 RBs; when the value of the first-level RBG size is 11, the BWP BW range of the activated BWP is 249 to 275 RBs; when the value of the first-level RBG size is 12, the BWP BW range of the activated BWP is 133 to 240 RBs; and when the value of the first-level RBG size is 16, the BWP BW range of the activated BWP is 241 to 275 RBs.

According to a fourth aspect of the embodiments of the present application, a resource allocation indication receiving device is provided, which may be applied to User Equipment (UE) and include: a first receiving module, configured to receive first indication information sent by a BS, where the first indication information is configured to indicate an activated BWP message and the activated BWP message includes at least BWP BW information; and a second receiving module, configured to receive second indication information sent by the BS, where the second indication information is configured to indicate one or more groups of first-level RBG sizes, each group of first-level RBG sizes includes multiple first-level RBG sizes, and each first-level RBG size corresponds to different BWP BWs, where there is a corresponding relationship between the first-level RBG size and different BWP BWs.

In an embodiment, the corresponding relationship may include that a value of the first-level RBG size is directly proportional to a BWP BW range.

In an embodiment, the corresponding relationship may include that: a value of the first-level RBG size includes at least one of 1, 2, 3, 4, 6, 8, 10, 11, 12 and 16; when the value of the first-level RBG size is 1, a BWP BW range of an activated BWP is RBs in a number less than or equal to one of 31, 26 and 22; when the value of the first-level RBG size is 2, the BWP BW range of the activated BWP is 32 to 62 RBs, or 27 to 62 RBs, or 23 to 44 RBs; when the value of the first-level RBG size is 3, the BWP BW range of the activated BWP is 45 to 66 RBs; when the value of the first-level RBG size is 4, the BWP BW range of the activated BWP is 63 to 124 RBs, or 67 to 132 RBs; when the value of the first-level RBG size is 6, the BWP BW range of the activated BWP is 125 to 176 RBs, or 67 to 132 RBs; when the value of the first-level RBG size is 8, the BWP BW range of the activated BWP is 177 to 248 RBs, or 125 to 248 RBs, or 125 to 220 RBs, or 125 to 227 RBs; when the value of the first-level RBG size is 10, the BWP BW range of the activated BWP is 249 to 275 RBs, or 221 to 275 RBs, or 228 to 275 RBs; when the value of the first-level RBG size is 11, the BWP BW range of the activated BWP is 249 to 275 RBs; when the value of the first-level RBG size is 12, the BWP BW range of the activated BWP is 133 to 240 RBs; and when the value of the first-level RBG size is 16, the BWP BW range of the activated BWP is 241 to 275 RBs.

According to a fifth aspect of the embodiments of the present application, a storage medium is also provided, which may include a stored program, the program running to execute any abovementioned method.

According to a sixth aspect of the embodiments of the present application, a processor is also provided, which may be configured to run a program, the program running to execute any abovementioned method.

According to a seventh aspect of the embodiments of the present application, a BS is also provided, which may include a processor and a memory storing an instruction executable for the processor, the instruction being executed by the processor to execute the operations of the method applied to a BS in the embodiments of the present application.

According to an eighth aspect of the embodiments of the present application, UE is also provided, which may include a processor and a memory storing an instruction executable for the processor, the instruction being executed by the processor to execute the operations of the method applied to UE in the embodiments of the present application.

Through the technical solutions of the embodiments of the present application, the BS sends the first indication information, where the first indication information is configured to indicate the activated BWP message and the activated BWP message includes at least the BWP BW information; and the BS sends the second indication information, where the second indication information is configured to indicate the one or more groups of first-level RBG sizes, each group of first-level RBG sizes includes the multiple first-level RBG sizes, each first-level RBG size corresponds to different BWP BWs and there is a corresponding relationship between the first-level RBG size and different BWP BWs. That is, a corresponding relationship between a BW range and a value of an RBG size is set, so that it is ensured that valid bits in resource allocation regions of different BWs are approximate, the problem of relatively high DCI blind detection complexity caused by adoption of resource allocation regions in different sizes for BWPs with different BWs in the related art is further solved, and the technical effect of reducing the DCI message blind detection complexity is achieved.

BRIEF DESCRIPTION OF THE DRAWINGS

The drawings described here are adopted to provide a deeper understanding to the present application and form a part of the present application. Schematic embodiments of the present application and descriptions thereof are adopted to explain the present application and not intended to form improper limits to the present application. In the drawings.

DETAILED DESCRIPTION OF THE EMBODIMENTS

The present application will be described below with reference to the drawings and in combination with the embodiments in detail. It is to be noted that the embodiments in the present application and characteristics in the embodiments may be combined without conflicts.

It is to be noted that the terms like "first" and "second" in the specification, claims and accompanying drawings of the present application are used for differentiating the similar objects, but do not have to describe a specific order or a sequence.

Figure 1:
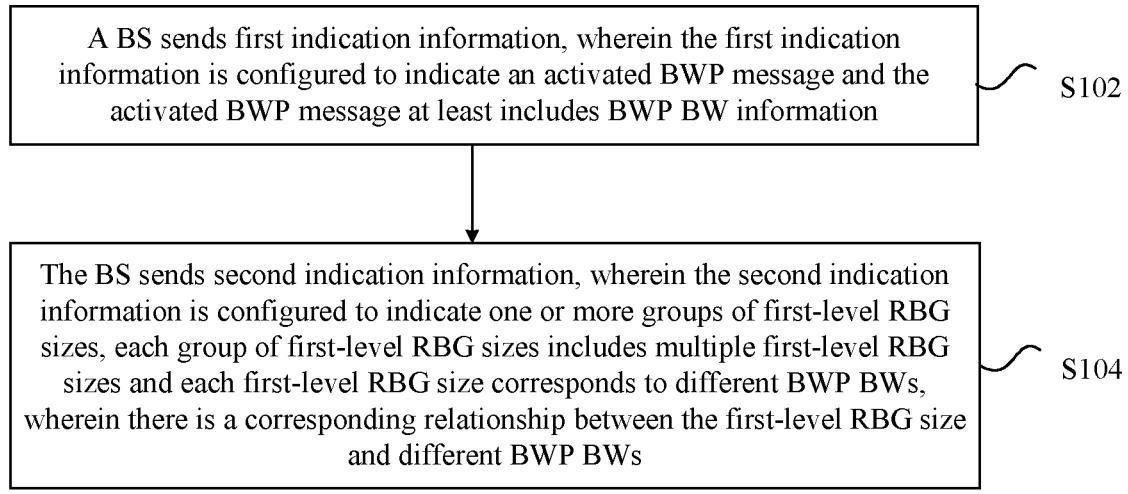
FIG. 1 is a flowchart of a resource allocation indication method according to an embodiment of the present application.

An embodiment provides a resource allocation indication method. FIG. 1 is a flowchart of a resource allocation indication method according to an embodiment of the present application. As shown in FIG. 1, the flow includes the following operations.

In S102, a BS sends first indication information, where the first indication information is configured to indicate an activated BWP message, and the activated BWP message includes at least BWP BW information.

In S104, the BS sends second indication information, where the second indication information is configured to indicate one or more groups of first-level RBG sizes, each group of first-level RBG sizes includes multiple first-level RBG sizes, and each first-level RBG size corresponds to different BWP BWs.

There is a corresponding relationship between the first-level RBG size and different BWP BWs.

Through S102 to S104, a corresponding relationship between a BW range and a value of an RBG size is set, so that it is ensured that valid bits in resource allocation regions of different BWs are approximate, the problem of relatively high DCI blind detection complexity caused by adoption of resource allocation regions in different sizes for BWPs with different BWs in the related art is further solved, and the technical effect of reducing the DCI message blind detection complexity is achieved.

In some exemplary embodiments, S102 and S104 may be interchanged. That is, S104 may be executed before execution of S102.

Figure 2:
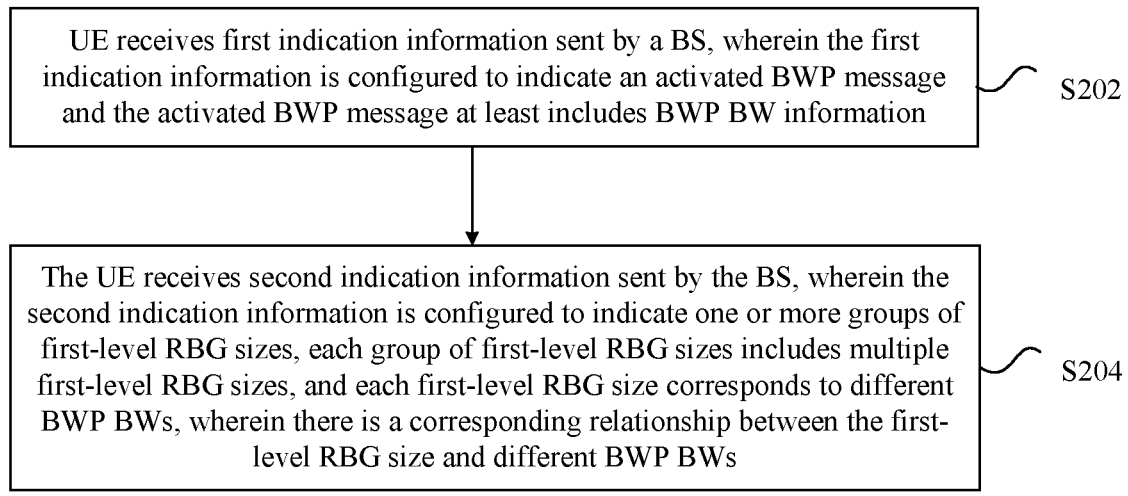
FIG. 2 is a flowchart of a resource allocation indication receiving method according to an embodiment of the present application.

An embodiment also provides a resource allocation indication receiving method. FIG. 2 is a flowchart of a resource allocation indication receiving method according to an embodiment of the present application. As shown in FIG. 2, the flow includes the following operations.

In S202, UE receives first indication information sent by a BS, where the first indication information is configured to indicate an activated BWP message, and the activated BWP message includes at least BWP BW information.

In S204, the UE receives second indication information sent by the BS, where the second indication information is configured to indicate one or more groups of first-level RBG sizes, each group of first-level RBG sizes includes multiple first-level RBG sizes, each first-level RBG size corresponds to different BWP BWs, and there is a corresponding relationship between the first-level RBG size and different BWP BWs.

Through S202 to S204, a corresponding relationship information between a BW range and a value of an RBG size is received from the BS, so that it is ensured that valid bits in resource allocation regions of different BWs are approximate, the problem of relatively high DCI blind detection complexity caused by adoption of resource allocation regions in different sizes for BWPs with different BWs in the related art is further solved, and the technical effect of reducing the DCI message blind detection complexity is achieved.

In some exemplary embodiments, S202 and S204 may be interchanged. That is, S204 may be executed before execution of S202.

The embodiment will be described below with examples in combination with exemplary embodiments.

Exemplary Embodiment 1

Figure 3:
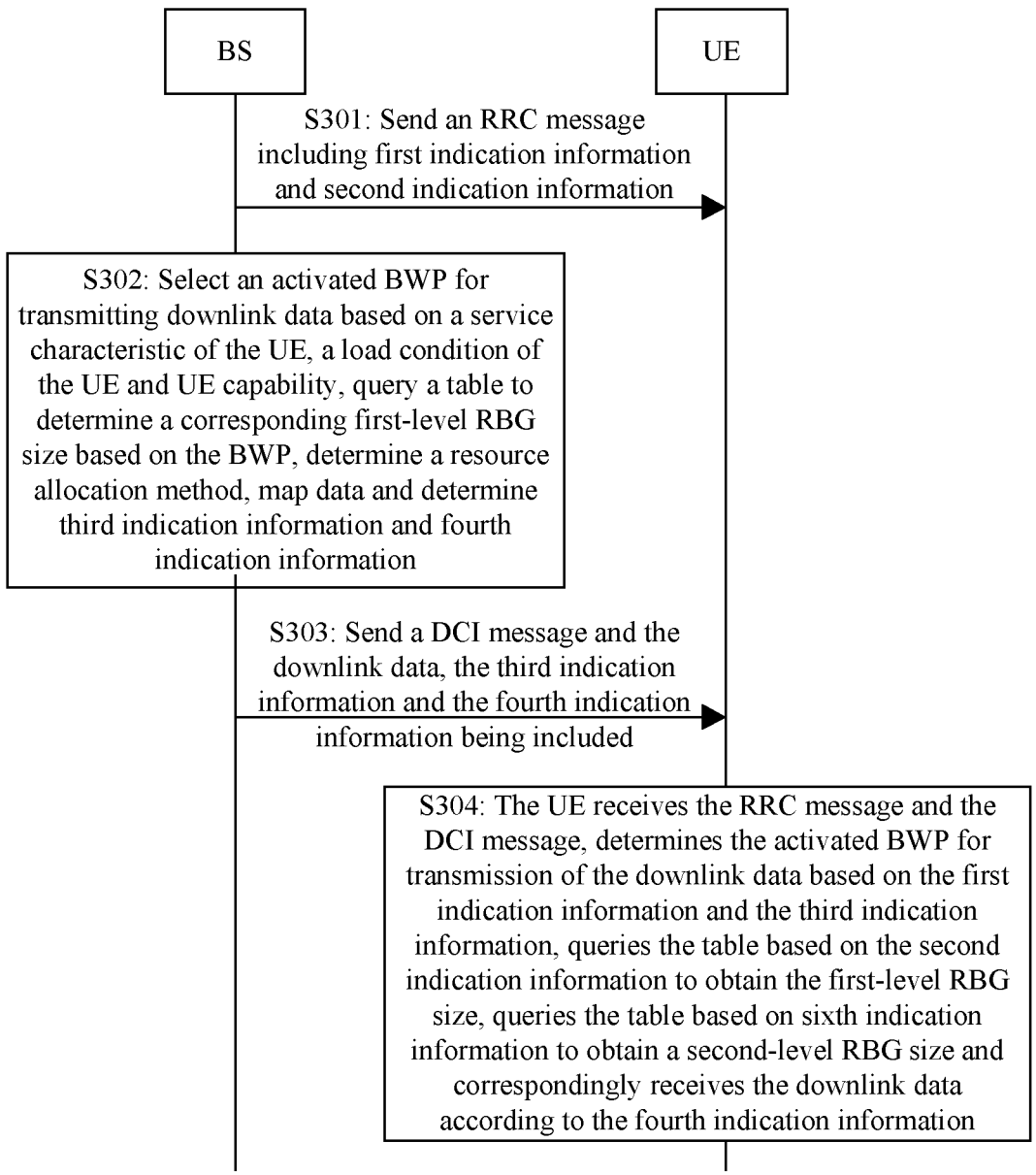
FIG. 3 is a first flowchart of an exemplary resource allocation indication method according to an embodiment of the present application.

The exemplary embodiment provides an exemplary downlink resource allocation embodiment. As shown in FIG. 3, the following operations are included.

In S301, a BS sends an RRC message to UE, where first indication information and second indication information is included in the RRC message.

In some exemplary embodiments, the first indication information is configured to indicate an activated BWP message, and the second indication information is configured to indicate one or more groups of first-level RBG sizes.

In some exemplary embodiments, the activated BWP message includes at least BWP BW information. For example, the first indication information indicates that the UE has four activated BWPs, and BWs of the four activated BWPs correspond to 50, 100, 25 and 200 RBs, respectively.

In some exemplary embodiments, each group of first-level RBG sizes in values of the one or more groups of RBG sizes includes multiple first-level RBG sizes, and each first-level RBG size corresponds to different BWP BWs.

In some exemplary embodiments, a corresponding relationship between the first-level RBG size and the corresponding BWP BW includes that: the first-level RBG size includes at least one of the following numerical values: 1, 2, 3, 4, 6, 8, 10, 11, 12 and 16.

When the value of the first-level RBG size is 1, a BWP BW range of an activated BWP is smaller than or equal to 31 RBs, or smaller than or equal to 26 RBs or smaller than or equal to 22 RBs. When the value of the first-level RBG size is 2, the BWP BW range of the activated BWP is 32 to 62 RBs, or 27 to 62 RBs, or 23 to 44 RBs. When the value of the first-level RBG size is 3, the BWP BW range of the activated BWP is 45 to 66 RBs. When the value of the first-level RBG size is 4, the BWP BW range of the activated BWP is 63 to 124 RBs, or 67 to 132 RBs. When the value of the first-level RBG size is 6, the BWP BW range of the activated BWP is 125 to 176 RBs, or 67 to 132 RBs. When the value of the first-level RBG size is 8, the BWP BW range of the activated BWP is 177 to 248 RBs, or 125 to 248 RBs, or 125 to 220 RBs, or 125 to 227 RBs. When the value of the first-level RBG size is 10, the BWP BW range of the activated BWP is 249 to 275 RBs, or 221 to 275 RBs, or 228 to 275 RBs. When the value of the first-level RBG size is 11, the BWP BW range of the activated BWP is 249 to 275 RBs. When the value of the first-level RBG size is 12, the BWP BW range of the activated BWP is 133 to 240 RBs. When the value of the first-level RBG size is 16, the BWP BW range of the activated BWP is 241 to 275 RBs.

For example, a group of first-level RBG sizes is indicated, as shown in Table 2.

TABLE 2

BWP BW vs. RGB size

| BWP BW | RBG size |
| --- | --- |
| 1-31 RBs | 1 |
| 32-62 RBs | 2 |
| 63-124 RBs | 4 |
| 125-176 RBs | 6 |
| 177-248 RBs | 8 |
| 249-275 RBs | 10 |

In some exemplary embodiments, the activated BWP message further includes a subcarrier spacing and position information.

In some exemplary embodiments, the BS sends sixth indication information, where the sixth indication information is configured to indicate a second-level RBG size, applied to a resource allocation manner 0.

In some exemplary embodiments, the first indication information, the second indication information, and the sixth indication information is sent through the RRC message.

In some exemplary embodiments, the first indication information and the second indication information may be configured and transmitted through different RRC messages.

In S302, the BS selects an activated BWP for transmitting downlink data based on a service characteristic of the UE, a load condition of the UE, and UE capability, queries a table to determine a corresponding first-level RBG size based on the BWP, determines a resource allocation method, maps data, and determines third indication information and fourth indication information.

In some exemplary embodiments, the BS sends the third indication information configured to indicate the selected activated BWP; and the BS sends the fourth indication information configured to indicate resource allocation. The number of bits required by the fourth indication information under different activated BWPs is a fixed value.

For example, the third indication information indicates four activated BWPs through two bits, for example, 01 indicates the second activated BWP to be switched and/or used, the number of correspondingly used RBs is 100, and the table is queried to find that a correspondingly used RBG size is 4. In addition, a practical resource allocation condition under the bandwidth is indicated through the fourth indication information, where a resource allocation granularity is four RBs.

In some exemplary embodiments, the number of the bits required by the fourth indication information is determined according to the following formula:

$$\max_{1 \leq i \leq n}\left(\left\lceil \log_2\left(\left\lceil \frac{N_{RB}^i}{G} \right\rceil * \left(\left\lceil \frac{N_{RB}^i}{G} \right\rceil + 1\right)/2\right)\right\rceil\right), \text{ or,} \quad (1)$$

$$\max_{1 \leq i \leq n}\left(\left\lceil \left\lceil \frac{N_{RB}^i}{G} \right\rceil / P \right\rceil\right), \quad (2)$$

where G is the first-level RBG size, $N_{RB}^i$ is a BW of an i-th activated BWP, n is the number of activated BWPs, i and n are integers, and P is the second-level RBG size, applied to the NR resource allocation manner 0;

when $$\left\lceil \frac{N_{RB}^i}{G} \right\rceil$$

is less than or equal to 12, a value of the second-level RBG size is 1; and when $$\left\lceil \frac{N_{RB}^i}{G} \right\rceil$$

is another value, the value of the second-level RBG size is 2.

For example, an NR resource allocation manner 1 is adopted, the number of the bits required by the fourth indication information is determined through the following formula, the bandwidths of the four activated BWPs correspond to 50, 100, 25, and 200 RBs, respectively and the first-level RBG sizes G are indexed to be 2, 4, 1, and 8, respectively. In such a case, a maximum bit number is calculated to be 9 through the following formula:

$$\max_{1 \leq i \leq n}\left(\left\lceil \log_2\left(\left\lceil \frac{N_{RB}^i}{G} \right\rceil * \left(\left\lceil \frac{N_{RB}^i}{G} \right\rceil + 1\right)/2\right)\right\rceil\right).$$

In some exemplary embodiments, if resource allocation of the selected activated BWP does not occupy the whole resource allocation region, higher bits of a sequence are filled with bits 0.

In some exemplary embodiments, valid bits in bits required by fourth indication information under different BWP BWs are approximate.

In some exemplary embodiments, the BS selects the part of activated BWPs based on one of the following information: the service characteristic of UE, the load condition of the UE, a capability condition of the UE, and a channel environment.

In S303, a DCI message and the downlink data are sent, the third indication information and the fourth indication information is included there.

In some exemplary embodiments, the third indication information and the fourth indication information is sent through the DCI message.

In S304, the UE receives the RRC message and the DCI message, determines the activated BWP for transmission of the downlink data based on the first indication information and the third indication information, queries the table based on the second indication information to obtain the first-level RBG size, queries the table based on sixth indication information to obtain a second-level RBG size, and receives the downlink data according to the fourth indication information.

For example, the UE determines the number of the bits required by the fourth indication information by two methods, the bandwidths of the four activated BWPs correspond to 50, 100, 25, and 200 RBs, respectively, the first-level RBG sizes G are indexed to be 2, 4, 1 and 8, respectively, and second-level RBG sizes are 2, 2, 2, and 2, respectively. In such a case, the maximum bit number calculated through the formula (1) is 9, the maximum bit number calculated through the formula (2) is 13, and the UE performs DCI message blind detection based on resource allocation regions being 9 bits and 13 bits. If Cyclic Redundancy Check (CRC) succeeds, a correct resource allocation manner is determined, for example, the resource allocation manner 1 is adopted. The third indication information indicates the four activated BWPs through two bits, for example, 01 indicates the second activated BWP to be switched and/or used, it is determined that the second activated BWP is used and the bandwidth is 100 RBs, and the table is queried through the second indication information to obtain that the value of the first-level RBG size is 4. That is, the resource allocation granularity is 4 RBs. In such a case, the UE determines RBs for practically transmitting the downlink data according to the resource allocation manner 1, the resource allocation granularity of four RBs, and the fourth indication information and receives the data.

Exemplary Embodiment 2

Figure 4:
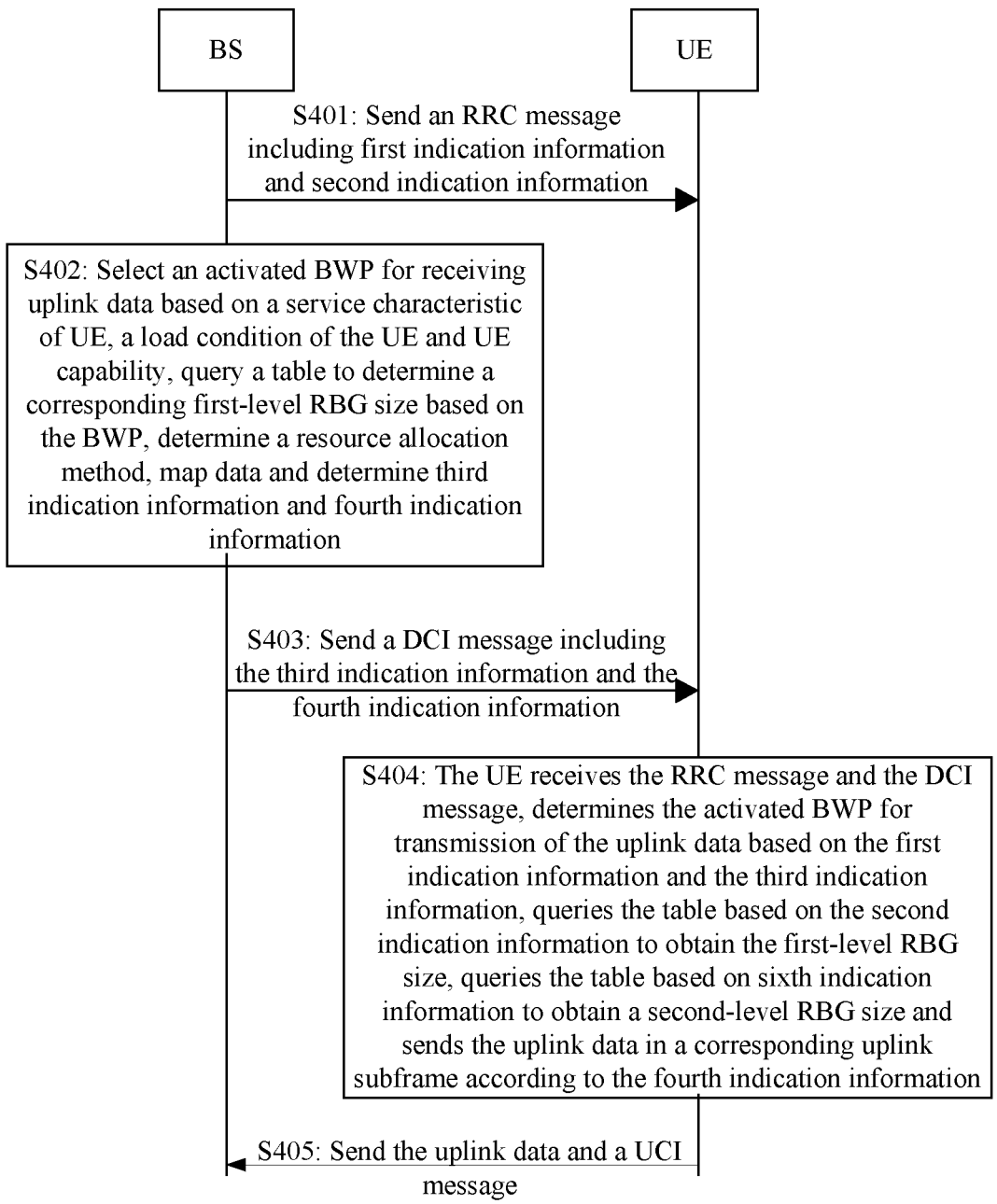
FIG. 4 is a second flowchart of an exemplary resource allocation indication method according to an embodiment of the present application.

The exemplary embodiment provides an exemplary uplink resource allocation embodiment. As shown in FIG. 4, the following operations are included.

In S401, a BS sends an RRC message to UE, where first indication information and second indication information is included in the RRC message.

In some exemplary embodiments, the first indication information is configured to indicate an activated BWP message, and the second indication information is configured to indicate one or more groups of first-level RBG sizes.

In some exemplary embodiments, the activated BWP message includes at least BWP BW information.

For example, the first indication information indicates that the UE has four activated BWPs, and BWs of the four activated BWPs correspond to 50, 100, 25 and 200 RBs, respectively.

In some exemplary embodiments, each group of first-level RBG sizes in values of the one or more groups of RBG sizes includes multiple first-level RBG sizes, and each first-level RBG size corresponds to different BWP BWs.

In some exemplary embodiments, the corresponding relationship between the first-level RBG size and the different BWP BW includes that: the first-level RBG size includes at least one of the following numerical values: 1, 2, 3, 4, 6, 8, 10, 11, 12 and 16; when the value of the first-level RBG size is 1, a BWP BW range of an activated BWP is smaller than or equal to 31 RBs, or smaller than or equal to 26 RBs or smaller than or equal to 22 RBs; when the value of the first-level RBG size is 2, the BWP BW range of the activated BWP is 32 to 62 RBs, or 27 to 62 RBs, or 23 to 44 RBs; when the value of the first-level RBG size is 3, the BWP BW range of the activated BWP is 45 to 66 RBs; when the value of the first-level RBG size is 4, the BWP BW range of the activated BWP is 63 to 124 RBs, or 67 to 132 RBs; when the value of the first-level RBG size is 6, the BWP BW range of the activated BWP is 125 to 176 RBs, or 67 to 132 RBs; when the value of the first-level RBG size is 8, the BWP BW range of the activated BWP is 177 to 248 RBs, or 125 to 248 RBs, or 125 to 220 RBs, or 125 to 227 RBs; when the value of the first-level RBG size is 10, the BWP BW range of the activated BWP is 249 to 275 RBs, or 221 to 275 RBs, or 228 to 275 RBs; when the value of the first-level RBG size is 11, the BWP BW range of the activated BWP is 249 to 275 RBs; and when the value of the first-level RBG size is 12, the BWP BW range of the activated BWP is 133 to 240 RBs. When the value of the first-level RBG size is 16, the BWP BW range of the activated BWP is 241 to 275 RBs.

For example, a group of first-level RBG sizes is indicated, as shown in Table 3.

TABLE 3

| BWP BW vs. RGB size | |
|---|---|
| BWP BW | RBG size |
| 1-31 RBs | 1 |
| 32-62 RBs | 2 |
| 63-124 RBs | 4 |
| 125-176 RBs | 6 |
| 177-248 RBs | 8 |
| 249-275 RBs | 11 |

In some exemplary embodiments, the activated BWP message further includes a subcarrier spacing and position information.

In some exemplary embodiments, the BS sends sixth indication information, where the sixth indication information is configured to indicate a second-level RBG size, applied to a resource allocation manner 0.

In some exemplary embodiments, the first indication information, the second indication information, and the sixth indication information is sent through the RRC message.

In some exemplary embodiments, the first indication information and the second indication information may be configured and transmitted through different RRC messages.

In S402, the BS selects an activated BWP for receiving uplink data based on a service characteristic of the UE, a load condition of the UE, and UE capability, queries a table to determine a corresponding first-level RBG size based on the BWP, determines a resource allocation method, and determines third indication information and fourth indication information.

In some exemplary embodiments, the BS sends the third indication information configured to indicate the selected activated BWP; and the BS sends the fourth indication information configured to indicate resource allocation. The number of bits required by the fourth indication information under different activated BWPs is a fixed value.

For example, the third indication information indicates four activated BWPs through two bits, for example, 01 indicates the second activated BWP to be switched and/or used, the number of correspondingly used RBs is 100, and the table is queried to find that a correspondingly used RBG size is 4. In addition, a practical resource allocation condition under the bandwidth is indicated through the fourth indication information, where a resource allocation granularity is four RBs.

In some exemplary embodiments, the number of the bits required by the fourth indication information is determined according to the following formula:

$$\max_{1 \leq i \leq n}\left(\left\lceil \log_2\left(\left\lceil \frac{N_{RB}^i}{G} \right\rceil * \left(\left\lceil \frac{N_{RB}^i}{G} \right\rceil + 1\right) / 2\right)\right\rceil\right), \text{ or,}$$

-continued $$\max_{1\leq i\leq n}\left(\left\lceil\frac{N_{RB}^i}{G}\right\rceil\Big/P\right),$$

where G is the first-level RBG size, $N_{RB}^i$ is a BW of an i-th activated BWP, n is the number of activated BWPs, i and n are integers and P is the second-level RBG size, applied to the NR resource allocation manner 0;
when $$\left\lceil\frac{N_{RB}^i}{G}\right\rceil$$

is less than or equal to 12, a value of the second-level RBG size is 1; and when $$\left\lceil\frac{N_{RB}^i}{G}\right\rceil$$

is another value, the value of the second-level RBG size is 2.

For example, an NR resource allocation manner 1 is adopted, the number of the bits required by the fourth indication information is determined through the following formula, the bandwidths of the four activated BWPs correspond to 50, 100, 25 and 200 RBs, respectively, and the first-level RBG sizes G are indexed to be 2, 4, 1 and 8, respectively. In such a case, a maximum bit number is calculated to be 9 through the following formula:

$$\max_{1\leq i\leq n}\left(\left\lceil\log_2\left(\left\lceil\frac{N_{RB}^i}{G}\right\rceil*\left(\left\lceil\frac{N_{RB}^i}{G}\right\rceil+1\right)\Big/2\right)\right\rceil\right).$$

In some exemplary embodiments, if resource allocation of the selected activated BWP does not occupy the whole resource allocation region, higher bits of a sequence are filled with bits 0.

In some exemplary embodiments, valid bits in bits required by fourth indication information under different BWP BWs are approximate.

In some exemplary embodiments, the BS selects the part of activated BWPs based on one of the following information: the service characteristic of UE, the load condition of the UE, a capability condition of the UE, and a channel environment.

In S403, a DCI message is sent, where the third indication information and the fourth indication information is included in the DCI message.

In some exemplary embodiments, the third indication information and the fourth indication information is sent through the DCI message.

In S404, the UE receives the RRC message and the DCI message, determines the activated BWP for transmission of the uplink data based on the first indication information and the third indication information, queries the table based on the second indication information to obtain the first-level RBG size, queries the table based on sixth indication information to obtain a second-level RBG size, and sends the uplink data in a corresponding uplink subframe according to the fourth indication information.

For example, the UE determines the number of the bits required by the fourth indication information by two methods, the bandwidths of the four activated BWPs correspond to 50, 100, 25, and 200 RBs, respectively, the first-level RBG sizes G are indexed to be 2, 4, 1 and 8, respectively, and second-level RBG sizes are 2, 2, 2 and 2, respectively. In such a case, the maximum bit number calculated through the formula (1) is 9, the maximum bit number calculated through the formula (2) is 13, and the UE performs DCI message blind detection based on resource allocation regions being 9 bits and 13 bits. If Cyclic Redundancy Check (CRC) succeeds, a correct resource allocation manner is determined, for example, the resource allocation manner 1 is adopted. The third indication information indicates the four activated BWPs through two bits, for example, 01 indicates the second activated BWP to be switched and/or used, it is determined that the second activated BWP is used and the bandwidth is 100 RBs, and the table is queried through the second indication information to obtain that the value of the first-level RBG size is 4. That is, the resource allocation granularity is 4 RBs. In such a case, the UE determines RBs for practically transmitting the uplink data according to the resource allocation manner 1, the resource allocation granularity of four RBs and the fourth indication information.

In S405, the uplink data and an Uplink Control Information (UCI) message are sent.

Exemplary Embodiment 3

Figure 5:
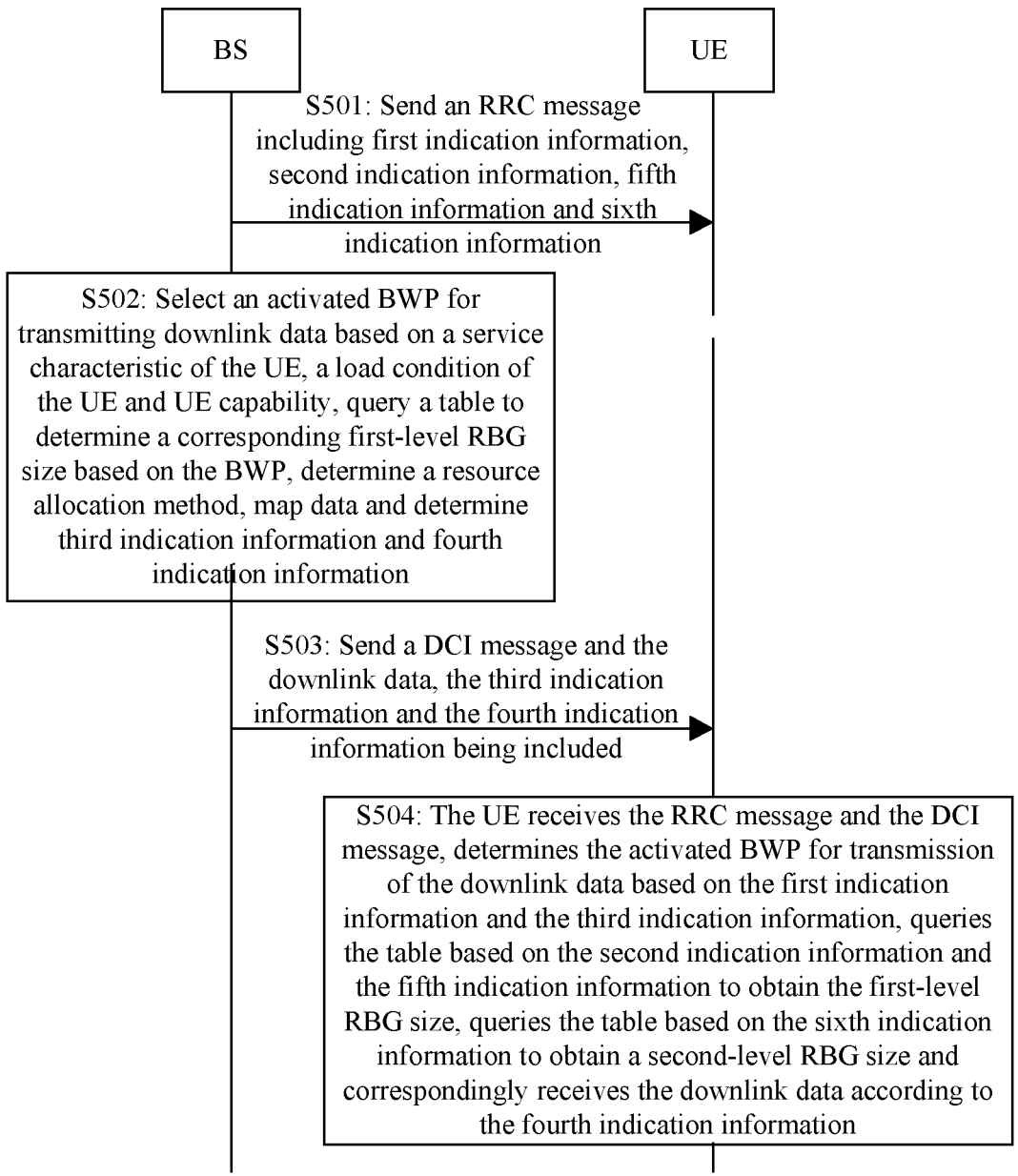
FIG. 5 is a third flowchart of an exemplary resource allocation indication method according to an embodiment of the present application.

The exemplary embodiment provides an exemplary downlink resource allocation embodiment. As shown in FIG. 5, the following operations are included.

In S501, a BS sends an RRC message to UE, where the RRC message includes first indication information, second indication information, fifth indication information and sixth indication information.

In some exemplary embodiments, the first indication information is configured to indicate an activated BWP message, and the second indication information is configured to indicate one or more groups of first-level RBG sizes.

In some exemplary embodiments, the activated BWP message includes at least BWP BW information.

For example, the first indication information indicates that the UE has four activated BWPs, and BWs of the four activated BWPs correspond to 50, 100, 25, and 200 RBs, respectively.

In some exemplary embodiments, each group of first-level RBG sizes in values of the one or more groups of RBG sizes includes multiple first-level RBG sizes, and each first-level RBG size corresponds to different BWP BWs.

In some exemplary embodiments, a corresponding relationship between the first-level RBG size and the corresponding BWP BW includes that: the first-level RBG size includes at least one of the following numerical values: 1, 2, 3, 4, 6, 8, 10, 11, 12 and 16.

When the value of the first-level RBG size is 1, a BWP BW range of an activated BWP is smaller than or equal to 31 RBs, or smaller than or equal to 26 RBs or smaller than or equal to 22 RBs. When the value of the first-level RBG size is 2, the BWP BW range of the activated BWP is 32 to 62 RBs, or 27 to 62 RBs, or 23 to 44 RBs. When the value of the first-level RBG size is 3, the BWP BW range of the activated BWP is 45 to 66 RBs. When the value of the first-level RBG size is 4, the BWP BW range of the activated BWP is 63 to 124 RBs, or 67 to 132 RBs. When the value of the first-level RBG size is 6, the BWP BW range of the activated BWP is 125 to 176 RBs, or 67 to 132 RBs. When the value of the first-level RBG size is 8, the BWP BW range of the activated BWP is 177 to 248 RBs, or 125 to 248 RBs, or 125 to 220 RBs, or 125 to 227 RBs. When the value of the first-level RBG size is 10, the BWP BW range of the activated BWP is 249 to 275 RBs, or 221 to 275 RBs, or 228 to 275 RBs. When the value of the first-level RBG size is 11, the BWP BW range of the activated BWP is 249 to 275 RBs. When the value of the first-level RBG size is 12, the BWP BW range of the activated BWP is 133 to 240 RBs. When the value of the first-level RBG size is 16, the BWP BW range of the activated BWP is 241 to 275 RBs.

For example, two groups of first-level RBG sizes are indicated, as shown in Table 4.

TABLE 4

BWP BW vs. RGB size

| BWP BW | RBG size config 1 | RBG size config 2 |
|---|---|---|
| 1-26 RBs | 1 | 2 |
| 27-62 RBs | 2 | 4 |
| 63-124 RBs | 4 | 8 |
| 125-220 RBs | 8 | 16 |
| 221-275 RBs | 10 | 20 |

In some exemplary embodiments, the activated BWP message further includes a subcarrier spacing and position information.

In some exemplary embodiments, the BS sends the sixth indication information, where the sixth indication information is configured to indicate a second-level RBG size, applied to a resource allocation manner 0.

In some exemplary embodiments, the BS sends the fifth indication information configured to indicate a group of first-level RBG sizes that is selected, for example, indicating through one bit, 0 representing that config1 is selected, and 1 representing that config2 is selected. For example, the fifth indication information is configured to be 0.

In some exemplary embodiments, the first indication information, the second indication information, and the sixth indication information is sent through the RRC message.

In some exemplary embodiments, the first indication information and the second indication information may be configured and transmitted through different RRC messages.

In S502, the BS selects an activated BWP for transmitting downlink data based on a service characteristic of the UE, a load condition of the UE, and UE capability, queries a table to determine a corresponding first-level RBG size based on the BWP, determines a resource allocation method, maps data, and determines third indication information and fourth indication information.

In some exemplary embodiments, the BS sends the third indication information configured to indicate the selected activated BWP; and the BS sends the fourth indication information configured to indicate resource allocation. The number of bits required by the fourth indication information under different activated BWPs is a fixed value.

For example, the third indication information indicates four activated BWPs through two bits, for example, 01 indicates the second activated BWP to be switched and/or used, the number of correspondingly used RBs is 100, and the table is queried to find that a correspondingly used RBG size is 4. In addition, a practical resource allocation condition under the bandwidth is indicated through the fourth indication information, where a resource allocation granularity is four RBs.

In some exemplary embodiments, the number of the bits required by the fourth indication information is determined according to the following formula:

$$\max_{1 \le i \le n}\left(\left\lceil \log_2\left(\left\lceil \frac{N_{RB}^i}{G} \right\rceil * \left(\left\lceil \frac{N_{RB}^i}{G} \right\rceil + 1\right)/2\right) \right\rceil\right), \text{ or,}$$

$$\max_{1 \le i \le n}\left(\left\lceil \left\lceil \frac{N_{RB}^i}{G} \right\rceil / P \right\rceil\right),$$

where G is the first-level RBG size, $N_{RB}^i$ is a BW of an i-th activated BWP, n is the number of activated BWPs, i and n are integers, and P is the second-level RBG size, applied to the NR resource allocation manner 0;

when $$\left\lceil \frac{N_{RB}^i}{G} \right\rceil$$

is less than or equal to 12, a value of the second-level RBG size is 1; and when $$\left\lceil \frac{N_{RB}^i}{G} \right\rceil$$

is another value, the value of the second-level RBG size is 2.

For example, an NR resource allocation manner 1 is adopted, the number of the bits required by the fourth indication information is determined through the following formula, the bandwidths of the four activated BWPs correspond to 50, 100, 25, and 200 RBs, respectively, and the first-level RBG sizes G are indexed to be 2, 4, 1, and 8, respectively. In such a case, a maximum bit number is calculated to be 9 through the following formula:

$$\max_{1 \le i \le n}\left(\left\lceil \log_2\left(\left\lceil \frac{N_{RB}^i}{G} \right\rceil * \left(\left\lceil \frac{N_{RB}^i}{G} \right\rceil + 1\right)/2\right) \right\rceil\right).$$

In some exemplary embodiments, if resource allocation of the selected activated BWP does not occupy the whole resource allocation region, higher bits of a sequence are filled with bits 0.

In some exemplary embodiments, valid bits in bits required by fourth indication information under different BWP BWs are approximate.

In some exemplary embodiments, the BS selects the part of activated BWPs based on one of the following information: the service characteristic of UE, the load condition of the UE, a capability condition of the UE, and a channel environment.

In S503, a DCI message and the downlink data are sent, where the third indication information and the fourth indication information is included there.

In some exemplary embodiments, the third indication information, and the fourth indication information is sent through the DCI message.

In S504, the UE receives the RRC message and the DCI message, determines the activated BWP for transmission of the downlink data based on the first indication information and the third indication information, queries the table based on the second indication information and the fifth indication information to obtain the first-level RBG size, queries the table based on the sixth indication information to obtain a second-level RBG size, and correspondingly receives the downlink data according to the fourth indication information.

For example, the UE determines the number of the bits required by the fourth indication information by two methods, the bandwidths of the four activated BWPs correspond to 50, 100, 25, and 200 RBs, respectively, the first-level RBG sizes G are indexed to be 2, 4, 1 and 8 according to the fifth indication information, respectively, and second-level RBG sizes are 2, 2, 2, and 2, respectively. In such a case, the maximum bit number calculated through the formula (1) is 9, the maximum bit number calculated through the formula (2) is 13, and the UE performs DCI message blind detection based on resource allocation regions being 9 bits and 13 bits. If Cyclic Redundancy Check (CRC) succeeds, a correct resource allocation manner is determined, for example, the resource allocation manner 1 is adopted. The third indication information indicates the four activated BWPs through two bits, for example, 01 indicates the second activated BWP to be switched and/or used, it is determined that the second activated BWP is used and the bandwidth is 100 RBs, and the table is queried through the second indication information to obtain that the value of the first-level RBG size is 4. That is, the resource allocation granularity is 4 RBs. In such a case, the UE determines RBs for practically transmitting the downlink data according to the resource allocation manner 1, the resource allocation granularity of four RBs, and the fourth indication information and receives the data.

Through the above descriptions about the implementation modes, those skilled in the art may clearly know that the methods according to the embodiment may be implemented in a manner of combining software and a required universal hardware platform and, of course, may also be implemented through hardware, but the former is a preferred implementation mode under many circumstances. Based on such an understanding, the technical solutions of the present application substantially or parts making contributions to a conventional art may be embodied in form of a software product. The computer software product is stored in a storage medium (for example, a Read-Only Memory (ROM)/Random Access Memory (RAM), a magnetic disk and an optical disk), including a plurality of instructions configured to enable a terminal device (which may be a mobile phone, a computer, a server, a network device or the like) to execute the method of each embodiment of the present application.

An embodiment also provides a resource allocation indication device, which is configured to implement the abovementioned embodiments and optional implementation modes. What has been described will not be elaborated. For example, term "module" used below may be a combination of software and/or hardware capable of realizing a preset function. Although the device described in the following embodiment is preferably implemented with software, implementation with hardware or a combination of the software and the hardware is also possible and conceivable.

Figure 6:
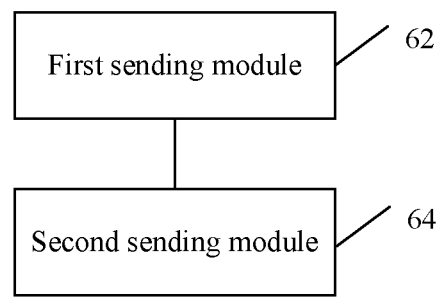
FIG. 6 is a structure block diagram of a resource allocation indication device according to an embodiment of the present application.

FIG. 6 is a structure block diagram of a resource allocation indication device according to an embodiment of the present application. As shown in FIG. 6, the device includes:

a first sending module 62, configured to send first indication information, where the first indication information is configured to indicate an activated BWP message and the activated BWP message includes at least BWP BW information; and a second sending module 64, configured to send second indication information, where the second indication information is configured to indicate one or more groups of first-level RBG sizes, each group of first-level RBG sizes includes multiple first-level RBG sizes, each first-level RBG size corresponds to different BWP BWs, and there is a corresponding relationship between the first-level RBG size and different BWP BWs.

Through the device shown in FIG. 6, a corresponding relationship between a BW range and a value of an RBG size is set, so that it is ensured that valid bits in resource allocation regions of different BWs are approximate, the problem of relatively high DCI blind detection complexity caused by adoption of resource allocation regions in different sizes for BWPs with different BWs in the related art is further solved, and the technical effect of reducing the DCI message blind detection complexity is achieved.

In some exemplary embodiments, the corresponding relationship includes that a value of the first-level RBG size is directly proportional to a BWP BW range.

In some exemplary embodiments, the corresponding relationship includes that: a value of the first-level RBG size includes at least one of 1, 2, 3, 4, 6, 8, 10, 11, 12 and 16; when the value of the first-level RBG size is 1, a BWP BW range of an activated BWP is RBs in a number less than or equal to one of 31, 26 and 22; when the value of the first-level RBG size is 2, the BWP BW range of the activated BWP is 32 to 62 RBs, or 27 to 62 RBs, or 23 to 44 RBs; when the value of the first-level RBG size is 3, the BWP BW range of the activated BWP is 45 to 66 RBs; when the value of the first-level RBG size is 4, the BWP BW range of the activated BWP is 63 to 124 RBs, or 67 to 132 RBs; when the value of the first-level RBG size is 6, the BWP BW range of the activated BWP is 125 to 176 RBs, or 67 to 132 RBs; when the value of the first-level RBG size is 8, the BWP BW range of the activated BWP is 177 to 248 RBs, or 125 to 248 RBs, or 125 to 220 RBs, or 125 to 227 RBs; when the value of the first-level RBG size is 10, the BWP BW range of the activated BWP is 249 to 275 RBs, or 221 to 275 RBs, or 228 to 275 RBs; when the value of the first-level RBG size is 11, the BWP BW range of the activated BWP is 249 to 275 RBs; when the value of the first-level RBG size is 12, the BWP BW range of the activated BWP is 133 to 240 RBs; and when the value of the first-level RBG size is 16, the BWP BW range of the activated BWP is 241 to 275 RBs.

In some exemplary embodiments, the device further includes a third sending module, configured to send third indication information, where the third indication information is configured to indicate a part of activated BWPs selected from activated BWPs, and further configured to send fourth indication information, where the fourth indication information is configured to indicate resource allocation and the number of bits required by the fourth indication information under different activated BWPs is a fixed value.

In some exemplary embodiments, the device further includes a fourth sending module, configured to send fifth indication information, where the fifth indication information is configured to indicate a second-level RBG size.

In some exemplary embodiments, the number of the bits required by the fourth indication information is determined according to the following formula:

$$\max_{1\leq i\leq n}\left(\left\lceil\log_2\left(\left\lceil\frac{N_{RB}^i}{G}\right\rceil*\left(\left\lceil\frac{N_{RB}^i}{G}\right\rceil+1\right)/2\right)\right\rceil\right), \text{ or,}$$

$$\max_{1\leq i\leq n}\left(\left\lceil\left\lceil\frac{N_{RB}^i}{G}\right\rceil/P\right\rceil\right),$$

where G is the first-level RBG size, $N_{RB}^i$ is a BW of an i-th activated BWP, n is the number of the activated BWPs, i and n are integers and P is the second-level RBG size; when $$\left\lceil\frac{N_{RB}^i}{G}\right\rceil$$

is less than or equal to 12, a value of the second-level RBG size is 1; and when $$\left\lceil\frac{N_{RB}^i}{G}\right\rceil$$

is more than 12, the value of the second-level RBG size is 2.

In some exemplary embodiments, the device further includes a fifth sending module, configured to send sixth indication information, where the sixth indication information is configured to indicate one group of RBG sizes selected from multiple groups of RBG sizes, and the multiple groups of RBG sizes represent different resource allocation granularities.

In some exemplary embodiments, valid bits in bits required by fourth indication information under different BWP BWs are approximate.

In some exemplary embodiments, the device further includes a selection module, configured to select the part of activated BWPs based on one of the following information: a service characteristic of UE, a load condition of the UE, a capability condition of the UE, and a channel environment.

In some exemplary embodiments, at least one piece of information in the first indication information, the second indication information, the fifth indication information, and the sixth indication information is sent through an RRC message.

In some exemplary embodiments, the third indication information and/or the fourth indication information is sent through a DCI message.

Figure 7:
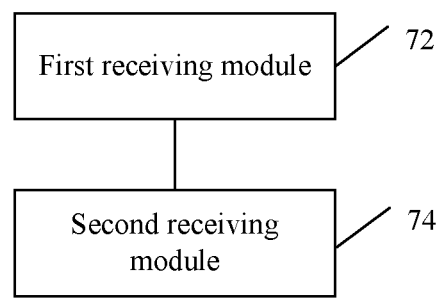
FIG. 7 is a structure block diagram of a resource allocation indication receiving device according to an embodiment of the present application.

An embodiment also provides a resource allocation indication receiving device. As shown in FIG. 7, the device includes:

a first receiving module 72, configured to receive first indication information sent by a BS, where the first indication information is configured to indicate an activated BWP message, and the activated BWP message includes at least BWP BW information; and a second receiving module 74, configured to receive second indication information sent by the BS, where the second indication information is configured to indicate one or more groups of first-level RBG sizes, each group of first-level RBG sizes includes multiple first-level RBG sizes, and each first-level RBG size corresponds to different BWP BWs, where there is a corresponding relationship between the first-level RBG size and different BWP BWs.

Through the device shown in FIG. 7, a corresponding relationship between a BW range and a value of an RBG size is received from the BS, so that it is ensured that valid bits in resource allocation regions of different BWs are approximate, the problem of relatively high DCI blind detection complexity caused by adoption of resource allocation regions in different sizes for BWPs with different BWs in the related art is further solved, and the technical effect of reducing the DCI message blind detection complexity is achieved.

In some exemplary embodiments, the corresponding relationship includes that a value of the first-level RBG size is directly proportional to a BWP BW range.

In some exemplary embodiments, the corresponding relationship includes that: a value of the first-level RBG size includes at least one of 1, 2, 3, 4, 6, 8, 10, 11, 12 and 16; when the value of the first-level RBG size is 1, a BWP BW range of an activated BWP is RBs in a number less than or equal to one of 31, 26 and 22; when the value of the first-level RBG size is 2, the BWP BW range of the activated BWP is 32 to 62 RBs, or 27 to 62 RBs, or 23 to 44 RBs; when the value of the first-level RBG size is 3, the BWP BW range of the activated BWP is 45 to 66 RBs; when the value of the first-level RBG size is 4, the BWP BW range of the activated BWP is 63 to 124 RBs, or 67 to 132 RBs; when the value of the first-level RBG size is 6, the BWP BW range of the activated BWP is 125 to 176 RBs, or 67 to 132 RBs; when the value of the first-level RBG size is 8, the BWP BW range of the activated BWP is 177 to 248 RBs, or 125 to 248 RBs, or 125 to 220 RBs, or 125 to 227 RBs; when the value of the first-level RBG size is 10, the BWP BW range of the activated BWP is 249 to 275 RBs, or 221 to 275 RBs, or 228 to 275 RBs; when the value of the first-level RBG size is 11, the BWP BW range of the activated BWP is 249 to 275 RBs; when the value of the first-level RBG size is 12, the BWP BW range of the activated BWP is 133 to 240 RBs; and when the value of the first-level RBG size is 16, the BWP BW range of the activated BWP is 241 to 275 RBs.

In some exemplary embodiments, the device further includes a third receiving module, configured to receive third indication information sent by the BS, where the third indication information is configured to indicate a part of activated BWPs selected from activated BWPs, and further configured to receive fourth indication information sent by the BS, where the fourth indication information is configured to indicate resource allocation, and the number of bits required by the fourth indication information under different activated BWPs is a fixed value.

In some exemplary embodiments, the device further includes a fourth receiving module, configured to receive fifth indication information sent by the BS, where the fifth indication information is configured to indicate a second-level RBG size.

In some exemplary embodiments, the number of the bits required by the fourth indication information is determined according to the following formula:

where G is the first-level RBG size, $N_{RB}^i$ is a BW of an i-th activated BWP, n is the number of the activated BWPs, i and n are integers and P is the second-level RBG size; when $$\left\lceil\frac{N_{RB}^i}{G}\right\rceil$$

is less than or equal to 12, a value of the second-level RBG size is 1; and when $$\left\lceil \frac{N_{RB}^i}{G} \right\rceil$$

is more than 12, the value of the second-level RBG size may be 2.

In some exemplary embodiments, the device further includes a fifth receiving module, configured to receive sixth indication information sent by the BS, where the sixth indication information is configured to indicate one group of RBG sizes selected from multiple groups of RBG sizes, and the multiple groups of RBG sizes represent different resource allocation granularities.

In some exemplary embodiments, valid bits in bits required by fourth indication information under different BWP BWs are approximate.

It is to be noted that each module may be implemented through software or hardware and, under the latter condition, may be implemented in, but not limited to, the following manner: the modules are all positioned in the same processor, or the modules are positioned in different processors in any combination form, respectively.

An embodiment of the present application also provides a storage medium, which includes a stored program, the program running to execute any abovementioned method.

Optionally, in the embodiment, the storage medium may include, but not limited to, various medium capable of storing program codes such as a U disk, a ROM, a RAM, a mobile hard disk, a magnetic disk or an optical disk.

An embodiment of the present application also provides a processor, which is configured to run a program, the program running to execute the operations in any abovementioned method.

Optionally, specific examples in the embodiment may refer to the examples described in the abovementioned embodiments and optional implementation modes and will not be elaborated in the embodiment.

An embodiment of the present application also provides a BS, which includes a processor and a memory storing an instruction executable for the processor, where the instruction is executed by the processor to execute the operations of the method applied to a BS in the embodiments of the present application.

An embodiment of the present application also provides UE, which includes a processor and a memory storing an instruction executable for the processor, where the instruction is executed by the processor to execute the operations of the method applied to UE in the embodiments of the present application.

It is apparent that those skilled in the art should know that each module or each step of the present application may be implemented through a universal computing device. They may be concentrated in a single computing device or distributed in a network formed by multiple computing devices. In some exemplary embodiments, they may be implemented by program codes executable for the computing devices and thus may be stored in a storage device for execution with the computing devices. Moreover, in some cases, the shown or described operations may be executed in sequences different from those described here, or may form various integrated circuit modules, respectively, or multiple modules or operations therein may form a single integrated circuit module for implementation. Therefore, the present application is not limited to any specific hardware and software combination.

The above is only the exemplary embodiment of the present application and not intended to limit the present application. For those skilled in the art, the present application may have various modifications and variations. Any modifications, equivalent replacements, improvements and the like made within the principle of the present application shall fall within the scope of protection of the present application.

What is claimed is:

1. A resource allocation indication method, comprising:
   sending, by a Base Station (BS), first indication information, wherein the first indication information is configured to indicate an activated Bandwidth Part (BWP) message and the activated BWP message at least comprises BWP Bandwidth (BW) information; and
   sending, by the BS, second indication information, wherein the second indication information is configured to indicate one or more groups of first-level Resource Block Group (RBG) sizes, each group of first-level RBG sizes comprises multiple first-level RBG sizes, and each first-level RBG size corresponds to different BWP BWs,
   wherein there is a corresponding relationship between the first-level RBG size and different BWP BWs;
   sending, by the BS, third indication information, wherein the third indication information is configured to indicate a part of activated BWPs selected from activated BWPs; and
   sending, by the BS, fourth indication information, wherein the fourth indication information is configured to indicate resource allocation and a number of bits required by the fourth indication information under different activated BWPs is a fixed value.

2. The method as claimed in claim 1, wherein the corresponding relationship comprises that a value of the first-level RBG size is directly proportional to a BWP BW range.

3. The method as claimed in claim 1, wherein
   the corresponding relationship comprises that: a value of the first-level RBG size comprises at least one of 1, 2, 3, 4, 6, 8, 10, 11, 12 and 16;
   when the value of the first-level RBG size is 1, a BWP BW range of an activated BWP is Resource Blocks (RBs) in a number less than or equal to one of 31, 26 and 22;
   when the value of the first-level RBG size is 2, the BWP BW range of the activated BWP is 32 to 62 RBs, or 27 to 62 RBs, or 23 to 44 RBs;
   when the value of the first-level RBG size is 3, the BWP BW range of the activated BWP is 45 to 66 RBs;
   when the value of the first-level RBG size is 4, the BWP BW range of the activated BWP is 63 to 124 RBs, or 67 to 132 RBs;
   when the value of the first-level RBG size is 6, the BWP BW range of the activated BWP is 125 to 176 RBs, or 67 to 132 RBs;
   when the value of the first-level RBG size is 8, the BWP BW range of the activated BWP is 177 to 248 RBs, or 125 to 248 RBs, or 125 to 220 RBs, or 125 to 227 RBs;
   when the value of the first-level RBG size is 10, the BWP BW range of the activated BWP is 249 to 275 RBs, or 221 to 275 RBs, or 228 to 275 RBs;
   when the value of the first-level RBG size is 11, the BWP BW range of the activated BWP is 249 to 275 RBs;
   when the value of the first-level RBG size is 12, the BWP BW range of the activated BWP is 133 to 240 RBs; and when the value of the first-level RBG size is 16, the BWP BW range of the activated BWP is 241 to 275 RBs.

4. The method as claimed in claim 1, further comprising:
sending, by the BS, fifth indication information, wherein the fifth indication information is configured to indicate a second-level RBG size.

5. The method as claimed in claim 4, wherein
the BS sends at least one of the following indication information through a Radio Resource Control (RRC) message:
the fifth indication information, and the sixth indication information.

6. The method as claimed in claim 1, wherein
valid bits in the bits required by the fourth indication information under different BWP BWs are approximate.

7. The method as claimed in claim 1, wherein
the BS sends at least one of the following indication information through a Radio Resource Control (RRC) message:
the first indication information, and the second indication information, the fifth indication information and the sixth indication information.

8. A resource allocation indication device, applied to a Base Station (BS) and comprising:
a first sending module, configured to send first indication information, wherein the first indication information is configured to indicate an activated Bandwidth Part (BWP) message and the activated BWP message at least comprises BWP Bandwidth (BW) information; and
a second sending module, configured to send second indication information, wherein the second indication information is configured to indicate one or more groups of first-level Resource Block Group (RBG) sizes, each group of first-level RBG sizes comprises multiple first-level RBG sizes, and each first-level RBG size corresponds to different BWP BWs, wherein there is a corresponding relationship between the first-level RBG size and different BWP BWs;
wherein the resource allocation indication device is further configured to:
send third indication information, wherein the third indication information is configured to indicate a part of activated BWPs selected from activated BWPs; and
send fourth indication information, wherein the fourth indication information is configured to indicate resource allocation and a number of bits required by the fourth indication information under different activated BWPs is a fixed value.

9. A resource allocation indication receiving method, comprising:
receiving, by User Equipment (UE), first indication information sent by a base Station (BS), wherein the first indication information is configured to indicate an activated Bandwidth Part (BWP) message and the activated BWP message at least comprises BWP Bandwidth (BW) information; and
receiving, by the UE, second indication information sent by the BS, wherein the second indication information is configured to indicate one or more groups of first-level Resource Block Group (RBG) sizes, each group of first-level RBG sizes comprises multiple first-level RBG sizes, and each first-level RBG size corresponds to different BWP BWs,
wherein there is a corresponding relationship between the first-level RBG size and different BWP BWs;

receiving, by the UE, third indication information sent by the BS, wherein the third indication information is configured to indicate a part of activated BWPs selected from activated BWPs; and receiving, by the UE, fourth indication information sent by the BS, wherein the fourth indication information is configured to indicate resource allocation and a number of bits required by the fourth indication information under different activated BWPs is a fixed value.

10. The method as claimed in claim 9, wherein the corresponding relationship comprises that a value of the first-level RBG size is directly proportional to a BWP BW range.

11. The method as claimed in claim 9, wherein the corresponding relationship comprises that: a value of the first-level RBG size comprises at least one of 1, 2, 3, 4, 6, 8, 10, 11, 12 and 16;
when the value of the first-level RBG size is 1, a BWP BW range of an activated BWP is Resource Blocks (RBs) in a number less than or equal to one of 31, 26 and 22;
when the value of the first-level RBG size is 2, the BWP BW range of the activated BWP is 32 to 62 RBs, or 27 to 62 RBs, or 23 to 44 RBs;
when the value of the first-level RBG size is 3, the BWP BW range of the activated BWP is 45 to 66 RBs;
when the value of the first-level RBG size is 4, the BWP BW range of the activated BWP is 63 to 124 RBs, or 67 to 132 RBs;
when the value of the first-level RBG size is 6, the BWP BW range of the activated BWP is 125 to 176 RBs, or 67 to 132 RBs;
when the value of the first-level RBG size is 8, the BWP BW range of the activated BWP is 177 to 248 RBs, or 125 to 248 RBs, or 125 to 220 RBs, or 125 to 227 RBs;
when the value of the first-level RBG size is 10, the BWP BW range of the activated BWP is 249 to 275 RBs, or 221 to 275 RBs, or 228 to 275 RBs;
when the value of the first-level RBG size is 11, the BWP BW range of the activated BWP is 249 to 275 RBs;
when the value of the first-level RBG size is 12, the BWP BW range of the activated BWP is 133 to 240 RBs; and
when the value of the first-level RBG size is 16, the BWP BW range of the activated BWP is 241 to 275 RBs.

12. The method as claimed in claim 11, wherein the number of the bits required by the fourth indication information is determined according to the following formula:

$$\max_{1\leq i\leq n}\left(\left\lceil \log_2\left(\left\lceil \frac{N_{RB}^i}{G}\right\rceil * \left(\left\lceil \frac{N_{RB}^i}{G}\right\rceil + 1\right)/2\right)\right\rceil\right), \text{ or,}$$

$$\max_{1\leq i\leq n}\left(\left\lceil \left\lceil \frac{N_{RB}^i}{G}\right\rceil / P\right\rceil\right),$$

where G is the first-level RBG size, $N_{RB}^i$ is a BW of an ith activated BWP, n is a number of the activated BWPs, i and n are integers and P is the second-level RBG size;
when $$\left\lceil \frac{N_{RB}^i}{G}\right\rceil$$

is less than or equal to 12, a value of the second-level RBG size is 1; and when $$\left\lceil \frac{N_{RB}^i}{G} \right\rceil$$

is more than 12, the value of the second-level RBG size is 2.

13. The method as claimed in claim 11, wherein
the BS selects the part of activated BWPs based on one of the following information:
a service characteristic of User Equipment (UE), a load condition of the UE, a capability condition of the UE, and a channel environment.

14. The method as claimed in claim 11, wherein
the BS sends the third indication information and/or the fourth indication information through a Downlink Control Information (DCI) message.

15. The method as claimed in claim 9, further comprising:
receiving, by the UE, fifth indication information sent by the BS, wherein the fifth indication information is configured to indicate a second-level RBG size.

16. The method as claimed in claim 9, wherein the number of the bits required by the fourth indication information is determined according to the following formula:

$$\max_{1 \leq i \leq n}\left(\left\lceil \log_2\left(\left\lceil \frac{N_{RB}^i}{G} \right\rceil * \left(\left\lceil \frac{N_{RB}^i}{G} \right\rceil + 1\right)/2\right)\right\rceil\right), \text{ or,}$$

$$\max_{1 \leq i \leq n}\left(\left\lceil \left\lceil \frac{N_{RB}^i}{G} \right\rceil / P \right\rceil\right),$$

where G is the first-level RBG size, $N_{RB}^i$ is a BW of an ith activated BWP, n is a number of the activated BWPs, i and n are integers and P is the second-level RBG size;
when $$\left\lceil \frac{N_{RB}^i}{G} \right\rceil$$

is less than or equal to 12, a value of the second-level RBG size is 1; and when $$\left\lceil \frac{N_{RB}^i}{G} \right\rceil$$

is more than 12, the value of the second-level RBG size is 2.

17. The method as claimed in claim 9, further comprising:
receiving, by the UE, sixth indication information sent by the BS, wherein the sixth indication information is configured to indicate one group of RBG sizes selected from multiple groups of RBG sizes, and the multiple groups of RBG sizes represent different resource allocation granularities.

18. The method as claimed in claim 9, wherein valid bits in bits required by the fourth indication information under different BWP BWs are approximate.

19. A resource allocation indication receiving device, applied to User Equipment (UE) and comprising:
a first receiving module, configured to receive first indication information sent by a Base Station (BS), wherein the first indication information is configured to indicate an activated Bandwidth Part (BWP) message and the activated BWP message at least comprises BWP Bandwidth (BW) information; and
a second receiving module, configured to receive second indication information sent by the BS, wherein the second indication information is configured to indicate one or more groups of first-level Resource Block Group (RBG) sizes, each group of first-level RBG sizes comprises multiple first-level RBG sizes, and each first-level RBG size corresponds to different BWP BWs,
wherein there is a corresponding relationship between the first-level RBG size and different BWP BWs;
wherein the resource allocation indication receiving device is further configured to:
receive third indication information sent by the BS, wherein the third indication information is configured to indicate a part of activated BWPs selected from activated BWPs; and receive fourth indication information sent by the BS, wherein the fourth indication information is configured to indicate resource allocation and a number of bits required by the fourth indication information under different activated BWPs is a fixed value.

* * * * *